(12) United States Patent
Lemos Alvares Dos Santos

(10) Patent No.: US 11,656,408 B2
(45) Date of Patent: May 23, 2023

(54) OPTICAL ASSEMBLY

(71) Applicant: Photon IP B.V., Eindhoven (NL)

(72) Inventor: Rui Manuel Lemos Alvares Dos Santos, Eindhoven (NL)

(73) Assignee: Photon IP B.V., Eindhoven (NL)

( * ) Notice: Subject to any disclaimer, the term of this patent is extended or adjusted under 35 U.S.C. 154(b) by 0 days.

(21) Appl. No.: 17/924,576

(22) PCT Filed: Sep. 27, 2021

(86) PCT No.: PCT/NL2021/050580
§ 371 (c)(1),
(2) Date: Nov. 10, 2022

(87) PCT Pub. No.: WO2022/066016
PCT Pub. Date: Mar. 31, 2022

(65) Prior Publication Data
US 2023/0119823 A1  Apr. 20, 2023

(30) Foreign Application Priority Data

Sep. 28, 2020  (NL) ................................. 2026563

(51) Int. Cl.
| | | |
|---|---|---|
| *G02B 6/12* | (2006.01) | |
| *G02B 6/26* | (2006.01) | |
| *G02B 6/42* | (2006.01) | |
| *G02B 6/30* | (2006.01) | |
| *G02B 6/122* | (2006.01) | |
| *G02B 6/125* | (2006.01) | |
| *G02B 6/136* | (2006.01) | |

(52) U.S. Cl.
CPC ........... *G02B 6/1228* (2013.01); *G02B 6/125* (2013.01); *G02B 6/136* (2013.01); *G02B 2006/12061* (2013.01); *G02B 2006/12176* (2013.01)

(58) Field of Classification Search
CPC ...... G02B 6/1228; G02B 6/125; G02B 6/136; G02B 2006/12061; G02B 2006/12176
USPC .... 385/12–16, 23, 27–29, 39, 43, 49, 50, 52
See application file for complete search history.

(56) References Cited

U.S. PATENT DOCUMENTS

| | | |
|---|---|---|
| 8,442,368 B1 | 5/2013 | Reano |
| 9,442,249 B2 | 9/2016 | Yoshida et al. |
| 9,664,858 B2 | 5/2017 | Mohammed et al. |
| 9,804,423 B2 | 10/2017 | Reano et al. |
| 10,564,354 B2 | 2/2020 | Fortusini et al. |
| 2002/0001435 A1 | 1/2002 | Steinberg |
| 2018/0024299 A1 | 1/2018 | Leijtens |

OTHER PUBLICATIONS

Jacobsen, Strained silicon as a new electro-optic material, Nature Macmillan Journals Ltd., May 11, 2006, pp. 199-202, vol. 441, London.

*Primary Examiner* — Kaveh C Kianni
*Assistant Examiner* — Hung Q Lam
(74) *Attorney, Agent, or Firm* — Marcus C. Dawes

(57) ABSTRACT

The present invention relates to an optical assembly comprising a first optical circuit and a second optical circuit. The invention further relates to an optical device in which the first and second optical circuit are fixedly connected to each other. In addition, the present invention relates to a method for manufacturing the optical device. According to the invention, flexible waveguide ends of waveguides on the second optical circuit are used that extend upwards from the second optical circuit to optically couple to waveguides on the first optical circuit.

20 Claims, 14 Drawing Sheets

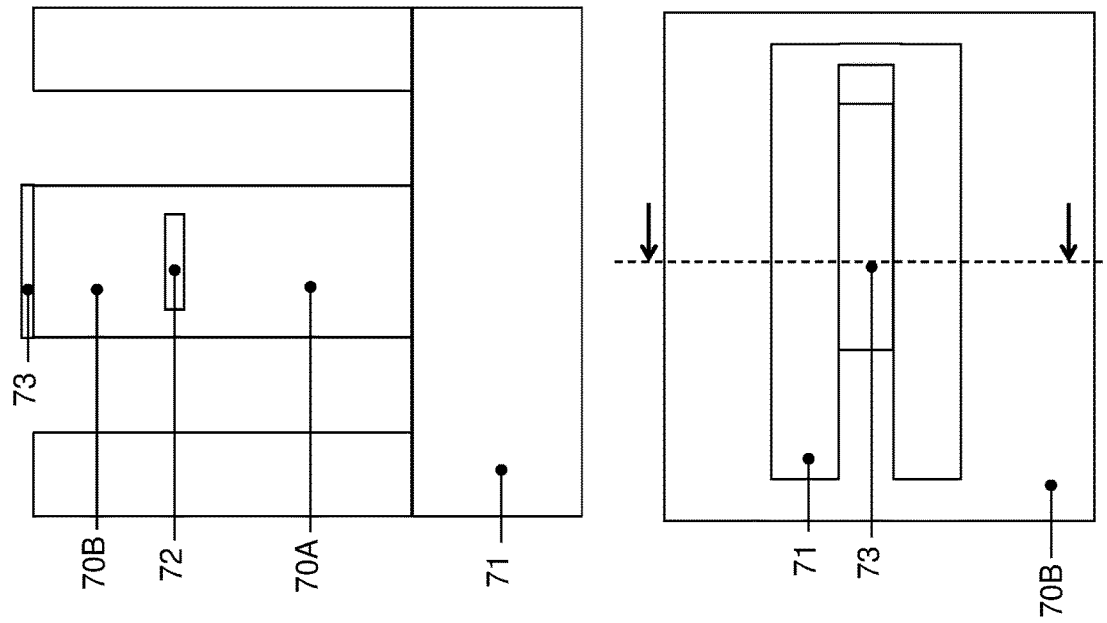
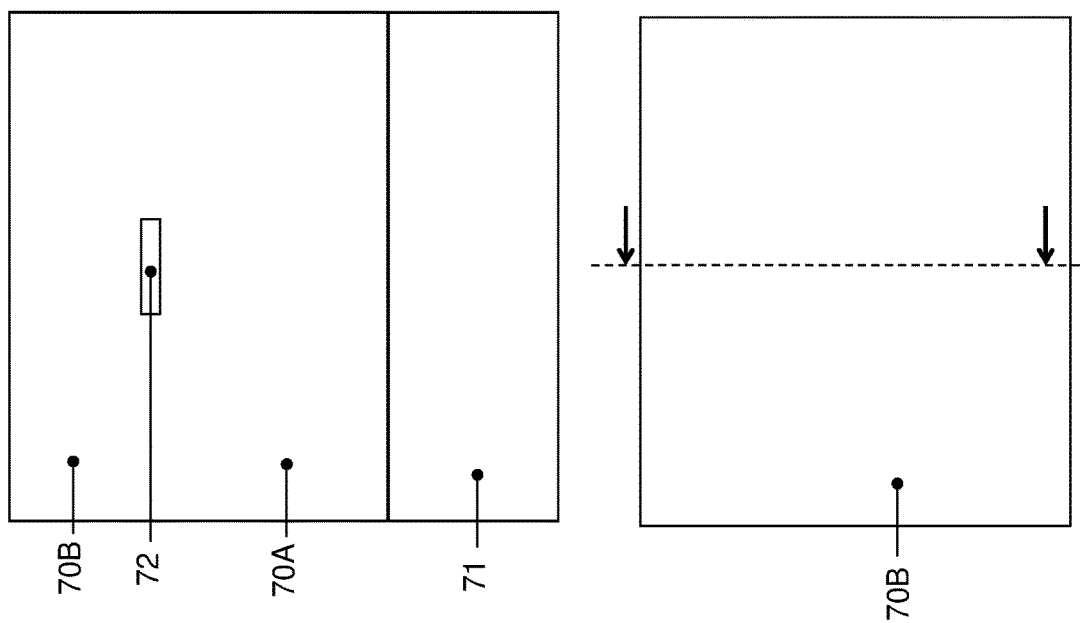
Fig 6B
Fig 6A

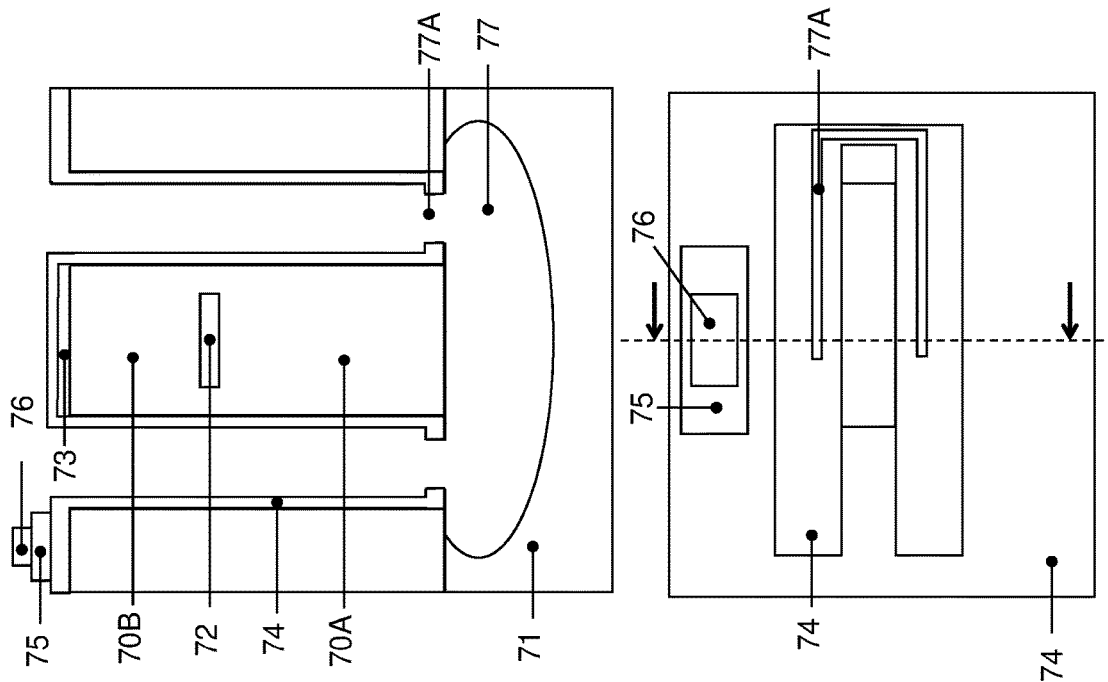
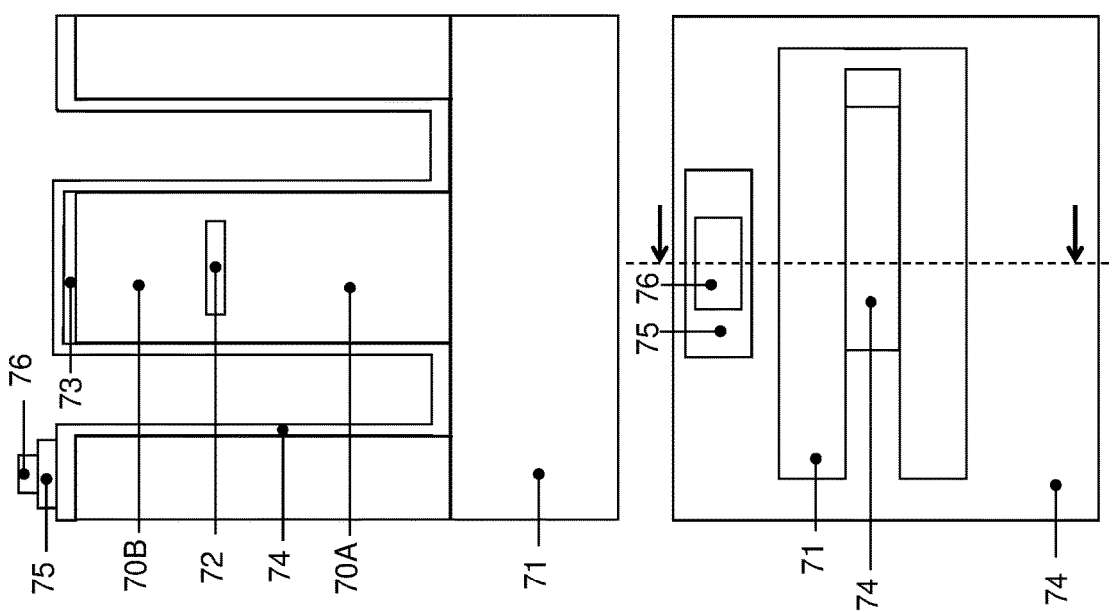
Fig 6D
Fig 6C

OPTICAL ASSEMBLY

The present invention relates to an optical assembly comprising a first optical circuit and a second optical circuit. The invention further relates to an optical device in which the first optical circuit and second optical circuit are fixedly connected to each other. In addition, the present invention relates to a method for manufacturing the optical device.

An optical assembly as defined in the preamble of claim 1 is known from WO 2016/131906. In this known optical assembly, the first optical circuit is an optically active circuit and comprises an optically active substrate, at least one first optical waveguide formed in the optically active substrate, and a first tapered recess in the optically active substrate arranged near a first end of the at least one first optical waveguide, said first tapered recess having a bottom surface, an end surface, and a pair of side surfaces extending from the bottom surface.

In the known optical assembly, the second optical circuit is an optically passive circuit that is formed by an interposer that includes at least one second optical waveguide. The interposer enables the at least one first waveguide on the optically active circuit to be coupled to at least one optical fiber. More in particular, on one end of the interposer, the at least one second waveguide is coupled to an optical fiber, whereas on another end the at least one second waveguide is coupled to the at least one first optical waveguide of the optically active circuit.

By fully removing the substrate underneath an end of the at least one second optical waveguide of the optically passive circuit, a finger is formed. This finger is visible both from the top and bottom of the interposer structure, which may aid in the alignment of the finger into a first tapered recess of the optically active circuit. In this manner, the end of the at least one second waveguide on the interposer becomes flexible allowing it to be arranged in the first tapered recesses. Generally, multiple fingers are formed for connecting a plurality of second optical waveguides on the optically passive circuit to a corresponding plurality of first optical waveguides on the optically active circuit.

Permanent fiber-chip coupling via the interposer can be provided by affixing the fingers into positions permanently. This can be achieved using index matching adhesives when the adhesive is in the optical path between the interposer and the at least one first waveguide of the optically active circuit. Alternatively, adhesives such as solder can be used outside of the first tapered recess for fixedly connecting the interposer to the optically active circuit.

Electrical connections between the interposer and the optically active circuit can be realized using one or more metal layers that cover the fingers and that make contact with metal pads on the optically active circuit.

In the known optical assembly, the alignment of the fingers is performed using the fingers themselves as a visual indicator. This was made possible by fully removing the substrate underneath them. Moreover, the alignment requires the interposer to be positioned at an angle relative to the optically active circuit. This complicates the alignment, reduces the reliability of the coupling between the interposer and the optically active circuit, and only allows one interposer to be connected to the optically active circuit at a time.

It is an object of the present invention to provide an optical assembly in which the abovementioned problems associated with coupling of the first and second optical circuit do not occur or at least to a lesser extent.

This object is achieved using the optical assembly of claim 1 that is characterized in that the first optical circuit further comprises a second tapered recess arranged near a second end of a first optical waveguide among the at least one first optical waveguide, said second tapered recess having a bottom surface, an end surface, and a pair of side surfaces extending from the bottom surface, and in that the second optical circuit further comprises a first recess arranged underneath a first end of a second optical waveguide among the at least one second optical waveguide, and a second recess underneath a second end of a second optical waveguide among the at least one second optical waveguide.

Said first end of a second optical waveguide and said second end of a second optical waveguide form a first and second flexible end, respectively, wherein the first and second flexible end extend away from the second optical substrate along at least partially opposite directions in absence of external forces acting thereon.

According to the invention, said first and second flexible end are configured to be received in the first and second tapered recess, respectively, for the purpose of allowing the first and second flexible end to exert a spring force onto the end surface of the first and second tapered recess, respectively, when fixedly coupling the first and second optical circuit. When the first and second optical circuit are fixedly connected, the first optical waveguide having the first tapered recess arranged near its first end is optically coupled via the end surface of the first tapered recess to the second optical waveguide having the first recess arranged near its first end and the first optical waveguide having the second tapered recess arranged near its second end is optically coupled via the end surface of the second tapered recess to the second optical waveguide having the second recess arranged near its second end.

Furthermore, the first optical circuit is one among an optically active circuit and an optically passive circuit and the second optical circuit is the other among the optically active circuit and an optically passive circuit.

Due to the spring force exerted onto the end surfaces, the first optical circuit can at least be partially clamped when connecting the first and second optical circuits. Moreover, the spring force ensures a low-loss optical coupling between the first flexible end and said first end of a first optical waveguide and between the second flexible end and said second end of a first optical waveguide.

The first optical circuit may be an optically active circuit, and the second optical circuit may be an optically passive circuit. Within the context of the present invention, an optically active circuit is an optical circuit that at least for the most part increases the optical energy by converting electrical energy supplied to the optically active circuit into optical energy. Conversely, an optically passive circuit is a circuit that at least for the most part only dissipates optical energy.

Said first end of a first optical waveguide and said second end of a first optical waveguide can be ends at opposite sides of a same first optical waveguide. Alternatively, said first end of a first optical waveguide and said second end of a first optical waveguide can be ends of different first optical waveguides, said different first optical waveguides preferably being arranged in parallel.

The first optical circuit may further comprise one or more first contact pads, and a first alignment mark. In addition, the second optical circuit may further comprise one or more second contact pads and a second alignment mark. In this case, the one or more first contact pads are configured to be fixedly connected to the one or more second contact pads, e.g. using an eutectic bond, solder, or a conductive adhesive. Furthermore, the first optical circuit and the second optical circuit can be configured such that when the first optical circuit and the second optical circuit have been mutually moved to bring the first and second alignment mark into a predefined lateral registration, and the first optical circuit and second optical circuit are subsequently brought closer together without substantially changing the lateral registration, the first and second flexible end are guided towards said first end of a first optical waveguide and said second end of a first optical waveguide by the bottom surface and at least one of the side surfaces of the first and second tapered recess, respectively, thereby enabling an optical coupling between said first flexible end and said first end of a first optical waveguide and between said second flexible end and said second end of a first optical waveguide.

The first and second alignment marks allows for accurate lateral alignment. For example, the first optical substrate and the second optical substrate are both essentially planar structures extending in an x-direction and a y-direction. Prior to connecting the first optical circuit and the second optical circuit, the circuits are mutually moved in the x-direction and/or y-direction until the distance in these directions between the first and second alignment mark meets a predetermined value. For example, the alignment marks may be said to be aligned when the distance in the y-direction equals 500+/−5 micrometer and the distance in the x-direction equals 300+/−5 micrometer. In a particular embodiment, the alignment marks are said to be aligned when the distance is less than 5 micrometers in both directions. Consequently, the mutual alignment of the first and second optical circuit can be relatively course, for example having a tolerance that is much greater than a characteristic dimension, e.g. width, of the at least one first or second optical waveguide. The final alignment between the flexible ends and the at least one first optical waveguide, of which the accuracy must in general be better than the abovementioned 5 micrometer, is facilitated due to the self-alignment of the flexible ends in the tapered recesses.

During the alignment of the first and second alignment mark, the first and second flexible end do not engage any of the surfaces of the first and second tapered recess, respectively. However, once the alignment marks are aligned, the first optical circuit and the second optical circuit are mutually moved in the z-direction. During this movement, the first and second flexible end will engage the first and second tapered recess, respectively. More in particular, the first and second flexible end will engage the bottom surface and at least side surface of the first and second tapered recess, respectively. Due to the shape of the first and second tapered recess, that tapers outwardly moving away from said first or second end of a first optical waveguide, respectively, the first and second flexible end will be guided towards said first or second end of a first optical waveguide. Due to the upward bending of the first and second flexible end it is ensured that the first and second flexible end engage the first or second tapered recess, respectively, even though the first optical circuit and the second optical circuit are still spaced apart in the z-direction. Furthermore, the upward bending ensures that sufficient force is exerted onto the first and second flexible end by the end surfaces of the first and second tapered recess, respectively, and vice versa, to aid proper positioning of the first and second flexible end relative to the first optical waveguide(s) and to ensure a low-loss optical coupling. More in particular, the end surfaces provide for a controllable end position allowing the flexible ends to stop at a same position. Furthermore, this positioning need not be disturbed by the presence of any adhesive on the second optical waveguide(s) or in the first or second tapered recess, as the fixed connection between the first optical circuit and the second optically circuit is realized using the one or more first contact pads and the one or more second contact pads.

A distance between the first and second flexible end prior to the first and second optical circuits engaging each other can be greater than a distance between the end surface of the first tapered recess and the end surface of the second tapered recess, and a distance between the first and second flexible end, if these ends are bent to be in line with the corresponding second optical waveguide, is smaller than a distance between the end surface of the first tapered recess and the end surface of the second tapered recess. In this manner, it can be ensured that the first and second flexible ends have to deform, preferably elastically, thereby exerting the spring force onto the end surfaces of the first and second tapered recess, respectively.

The first and second flexible end may extend away from the second optical substrate along a first direction and second direction, respectively, each of the first and second direction having a component parallel to the second optical substrate and a component perpendicular to the second optical substrate, wherein the parallel components corresponding to the first and second flexible end point in at least partially opposite directions. By exerting a spring force from at least partially opposite directions, an at least partial clamping can be obtained of the first optical circuit by the second optical circuit. Furthermore, each parallel component may be divided in a second component along a third direction and a third component along a fourth direction perpendicular to the third direction, wherein the second component corresponding to the first direction is opposite to the second component corresponding to the second direction and/or wherein the third component corresponding to the first direction is opposite to the third component corresponding to the second direction. In this manner, the spring forces can be applied symmetrically. Here, a component is said to be opposite to another component if it has the opposite sign and also preferably an equal magnitude.

The optical assembly may comprise a plurality of said first tapered recesses for a corresponding plurality of first optical waveguides, a plurality of said second tapered recesses for a corresponding plurality of first optical waveguides, a plurality of said first flexible ends for a corresponding plurality of second optical waveguides, and a plurality of said second flexible ends for a corresponding plurality of second optical waveguides, each first and second flexible end being configured to be received in a respective first and second tapered recess, respectively, the first and second flexible ends each extending away from the second optical substrate along a respective first direction and a respective second direction, respectively, each of the respective first and second direction having a component parallel to the second optical substrate and a component perpendicular to the second optical substrate. Each respective parallel component can be divided in a second component along a third direction and a third component along a fourth direction perpendicular to the third direction, and a sum of the second components and/or a sum of the third components can be substantially zero. Preferably, it can be achieved that the combined spring force exerted onto the first optical circuit can be substantially zero in at least one of the third and fourth direction.

The at least one second optical waveguide may comprise a first layer arranged on a second layer. Moreover, when the first and second optical circuits are fixedly connected, the first layer is arranged in between the second layer and the first optical substrate. The first layer can be under tensile strain relative to the second layer or the second layer can be under compressive strain relative to the first layer. Due to the imbalance in strain in the second optical waveguide, when etching away material underneath the first end of a second optical waveguide for the purpose of creating the first recess, the first end of the second optical waveguide will bend upward thereby creating the first flexible end. Flexibility of the first flexible end of the second optical waveguide is related to the width and thickness of the second optical waveguide. Similar considerations apply when creating the second flexible end.

The first layer can only be provided on the second layer in a region corresponding to the first and second flexible end. In other regions of the at least one second optical waveguide the first layer may be omitted as the difference in strain is not required.

A maximum angle of inclination of the first and second flexible end relative to a plane parallel to the second optical substrate may lie in a range between 1 and 45 degrees, and more preferably between 3 and 30 degrees. Outside of this range, the first and second flexible end are at risk of breaking or they will not extend sufficiently far into the first or second tapered recess, respectively, during the mutual movement in the z-direction of the first optical circuit and the second optical circuit. In addition, a length of the first and second flexible end may lie in a range between 50 and 1000 micrometer. Additionally or alternatively, a width of the first and second flexible end may lie in a range between 0.5 and 20 micrometer, and a thickness of the first and second flexible end may lie within a range between 50 and 150 percent of the width of the first and second flexible end, respectively.

A width of the at least one first optical waveguide may lie in a range between 0.1 and 10 micrometer, and a thickness of the at least one first optical waveguide may lie in a range between 0.1 and 5 micrometer.

Various functions may be implemented in the optically active circuit and the optically passive circuit. For example, at least one passive element of the group of passive elements consisting of a filter, a combiner, a polarization convertor, and a splitter, may be implemented in the optically passive circuit. Additionally or alternatively, at least one active element of the group of active elements consisting of a laser, a semiconductor optical amplifier, a phase modulator, an amplitude modulator, and a photodetector may be implemented in the optically active circuit. In this latter case, the optically active circuit may comprise one or more electrical terminals connected to the at least one active element for receiving or outputting an electrical signal and/or for receiving electrical power, wherein at least one among the one or more electrical terminals is connected to and/or formed by a respective first contact pad among the one or more first contact pads. Accordingly, the same structure can be used for fixedly connecting the optically active circuit and the optically passive circuit as for realizing the required electrical connection for operating the at least one active element.

The first optical waveguide among the at least one first optical waveguide may end in the corresponding first and/or second tapered recess. For example, the corresponding first and/or second tapered recess may comprise a first segment in which said first optical waveguide among the at least one first optical waveguide ends. This first segment may be wider than a last part of that first optical waveguide but smaller than the first or second flexible end of the corresponding second optical waveguide that is to be received in said corresponding first or second tapered recess. The corresponding first and/or second tapered recess may comprise a second segment connected to the first segment. The second segment may be wider than both the first segment and the first or second flexible end of the corresponding second optical waveguide that is to be received in said corresponding first or second tapered recess. Furthermore, a boundary between the first and second segments can be configured to form the end surface of the corresponding first or second tapered recess against which the first or second flexible end of the corresponding second optical waveguide that is to be received in said corresponding first or second tapered recess abuts after having fixedly connected the one or more first and second contact pads.

Alternatively, an end facet of the first optical waveguide that is arranged near the corresponding first or second tapered recess may form the end surface of that tapered recess.

The optically active circuit may further comprise a first contact ring arranged around the at least one first optical waveguide, and the optically passive circuit may further comprise a second contact ring arranged around the at least one second optical waveguide, wherein the first and second contact rings are configured to be fixedly connected to each other for the purpose of providing a sealing for the at least one first optical waveguide and the at least one second optical waveguide. Such sealing may be beneficial for protecting the coupling between the at least one first optical waveguide and the at least one second optical waveguide against environmental conditions, such as humidity and pollutants, and/or protecting the exposed facets of the flexible ends and/or protecting the exposed facets of the at least one first optical waveguide.

The one or more first contact pads and the one or more second contact pads may each comprise one or more metal layers to allow them to be connected through soldering, preferably eutectic soldering, or bonding, preferably eutectic bonding, using the simultaneous application of heat and pressure. Prior to connecting the first and second contact pads, solder or another adhesive may be applied to at least one of the first and second contact pads. Similar considerations hold for the first and second contact rings.

The first or second optical substrate corresponding to the optically active circuit may comprise a first cladding layer having a first doping type, a second cladding layer having a second doping type different from the first doping type, and an active layer arranged in between the first and second cladding layers. The at least one first or second optical waveguide being part of the optically active circuit may have been formed by etching through at least a part of the first cladding layer. Additionally or alternatively, the optically active circuit may comprise a first metal contact to the first cladding layer that is connected to a respective first or second contact pad among the one or more first or second contact pads, and a second metal contact to the second cladding layer that is connected to a respective first or second contact pad among the one or more first or second contact pads.

The first cladding layer may comprise a first sublayer, a second sublayer, and a first etch stop layer arranged in between the first and second sublayers. The first etch stop layer can be a stop layer for stopping a particular wet-chemical etching step. The at least one first or second optical waveguide being part of the optically active circuit may have been formed by etching up to the first etch stop layer. Similarly, the second cladding layer may comprise a first sublayer, a second sublayer, and a second etch stop layer arranged in between the first and two sublayers, wherein the second metal contact has been formed by an etch up to the second etch stop layer and a metal layer arranged in the cavity formed by said etch. The second etch stop layer can be a stop layer for stopping a particular wet-chemical etching step.

The first and second cladding layers can be made from indium phosphide, gallium arsenide, or gallium antimonide, and/or wherein the second cladding layer is arranged on an indium phosphide, gallium arsenide, or gallium antimonide substrate having a same doping type as the second cladding layer. The active layer can be made from indium gallium arsenide phosphide, aluminum indium gallium arsenide or antimonide based materials. However, the present invention is not limited to these materials.

The optically passive substrate may comprise a guiding layer, a carrier substrate, and a cladding layer arranged in between the guiding layer and the carrier substrate. In this case, the at least one first or second optical waveguide being part of the optically passive circuit has been formed by etching through the cladding layer and guiding layer, preferably up to the carrier substrate. Additionally or alternatively, when the second optical circuit is the optically passive circuit, the first and second flexible end of said a second optical waveguide among the at least one second optical waveguide have been formed by partially etching the carrier substrate underneath the cladding layer. Furthermore, a stress layer may be arranged on the guiding layer, which stress layer is under tensile strain and which stress layer is configured to cause, at least in part, the upward bending of the first and second flexible waveguide. The stress layer can be a silicon nitride layer $Si_xN_y$, but the invention is not limited thereto.

The guiding layer can be a silicon layer, preferably a monocrystalline layer. Furthermore, the cladding layer can be a silicon oxide layer $Si_xO_y$, and the carrier substrate may comprise a silicon substrate.

Alternatively, the guiding layer can be embedded into the cladding layer, wherein the guiding layer is a silicon nitride layer $Si_xN_y$, and the cladding layer is a silicon oxide layer $Si_xO_y$. In this case, the at least one first or second optical waveguide being part of the optically passive circuit can be formed by etching through the cladding layer, preferably up to the carrier substrate.

The optical assembly may further comprise a further optically active circuit configured as the aforementioned optically active circuit. In such case, the optically passive circuit can be configured to be coupled to the further optically active circuit in a same manner as to the aforementioned optically active circuit.

According to a second aspect, the present invention relates to an optical device comprising the optical assembly as described above, wherein the optically active circuit, and in so far as present, the further optically active circuit, is/are fixedly connected to the optically passive circuit.

According to a third aspect, the present invention relates to a method for manufacturing the abovementioned optical device in so far as the first optical circuit comprises one or more first contact pads and a first alignment mark, and the second optical circuit further comprises one or more second contact pads and a second alignment mark. This method comprises mutually moving the first optical circuit and the second optical circuit to bring the first and second alignment mark into a predefined lateral registration. The method further comprises the step of, after having obtained the predefined lateral registration, bringing the first and second optical circuit closer together without substantially changing the lateral registration during which movement the first and second flexible end are guided towards said first end of a first optical waveguide and said second end of a first optical waveguide by the bottom surface and at least one of the side surfaces of the first and second tapered recess, respectively, thereby enabling an optical coupling between said first flexible end and said first end of a first optical waveguide and between said second flexible end and said second end of a first optical waveguide. As a final step, the first and second optical circuit are fixedly connected by fixedly connecting the one or more first contact pads to the one or more second contact pads.

Next, the present invention will be described in more detail referring to the appended drawings, wherein.

Figure 7B:
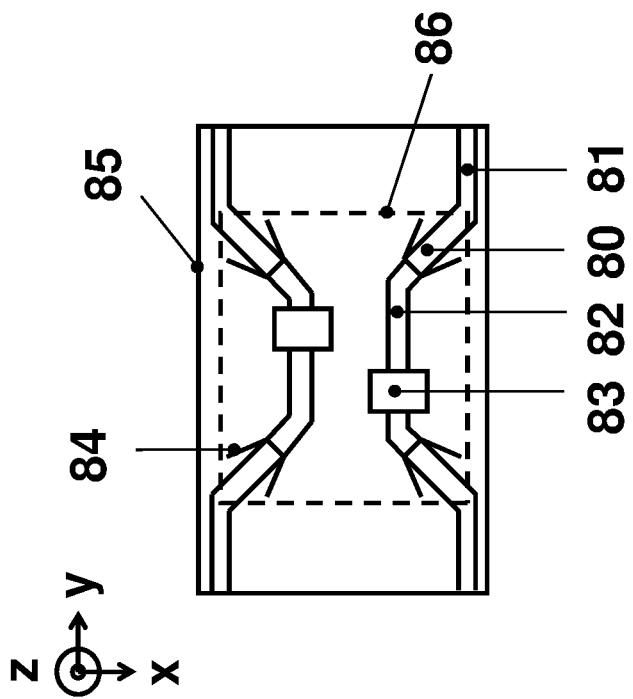
Figure 7A:
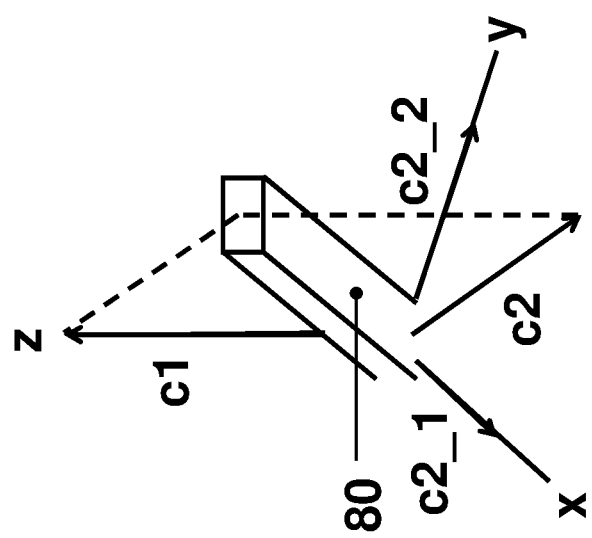

FIGS. 6A-6D illustrate different processing steps for manufacturing an optically passive circuit wherein the optical waveguides are formed using a silicon nitride layer embedded in a silicon oxide layer; and FIG. 7A illustrates a decomposition of the direction along which a flexible end extends away from the second optical substrate, and FIG. 7B illustrates an example in which the forces exerted by the flexible ends in different directions substantially compensate each other.

Figure 1A:
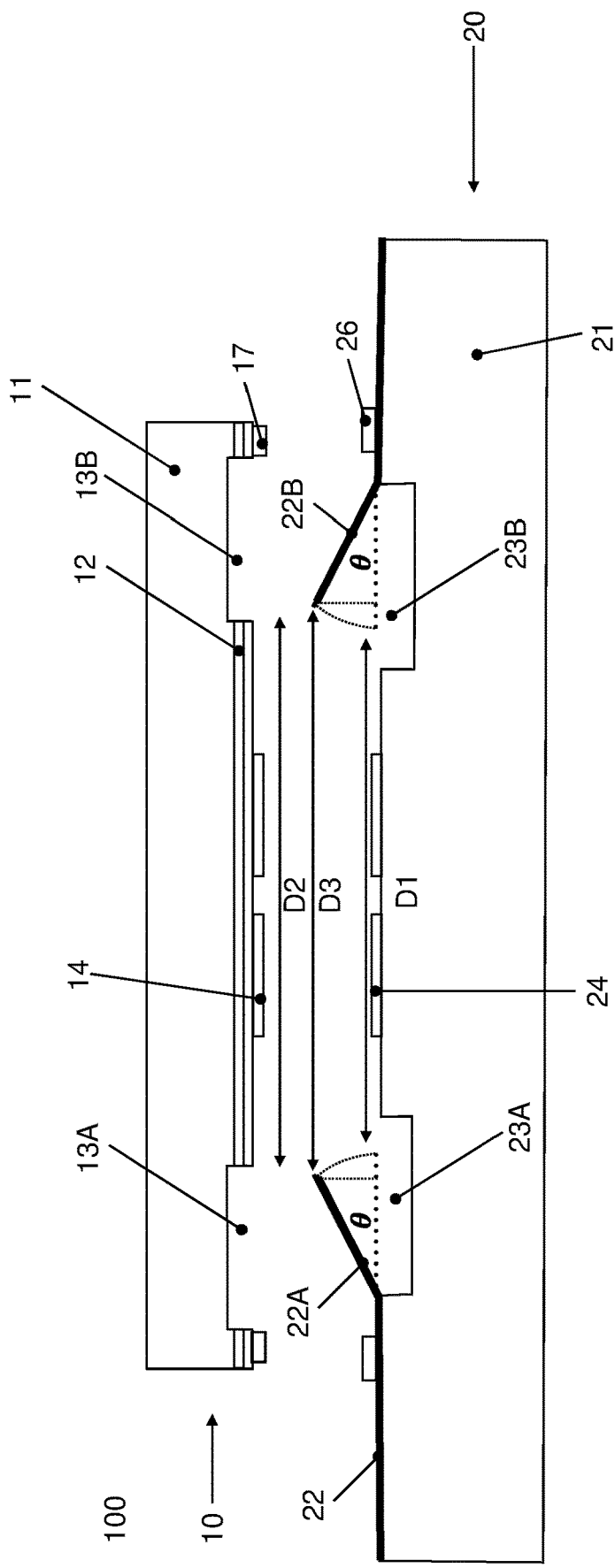
FIGS. 1A and 1B illustrate a schematic cross section of coupling an optically active circuit to an optically passive circuit in accordance with the present invention.

In FIG. 1A, an assembly 100 is shown that comprises an optically active circuit 10 and an optically passive circuit 20 in an uncoupled state. Optically active circuit 10 is shown schematically as having an optically active substrate 11 comprising an optically active layer 12. Here, a first optical waveguide is formed using optically active layer 12. At the opposite ends of this waveguide, a tapered recess 13A, 13B is provided. Furthermore, first contact pads 14 are provided, which are typically realized using one or more metal layers. As shown, a distance between the end walls of tapered recesses 13A, 13B equals a distance D2.

Optically passive circuit 20 comprises an optically passive substrate 21 in which second optical waveguides 22 are formed. Recesses 23 are arranged near ends of waveguides 22. Due to the partial removal of substrate 21 underneath these ends, flexible ends 22A, 22B are formed that bend upwards under an angle θ relative to a plane that is parallel to substrate 21. In addition, second contact pads 24 are provided that are typically made using one or more metal layers. In addition, as shown, a distance between the tips of ends 22A, 22B equals a distance D3. Furthermore, a distance between the tips of ends 22A, 22B when these ends 22A, 22B lie parallel to substrate 21 equals a distance D1. As shown, D3>D2>D1.

Figure 1B:
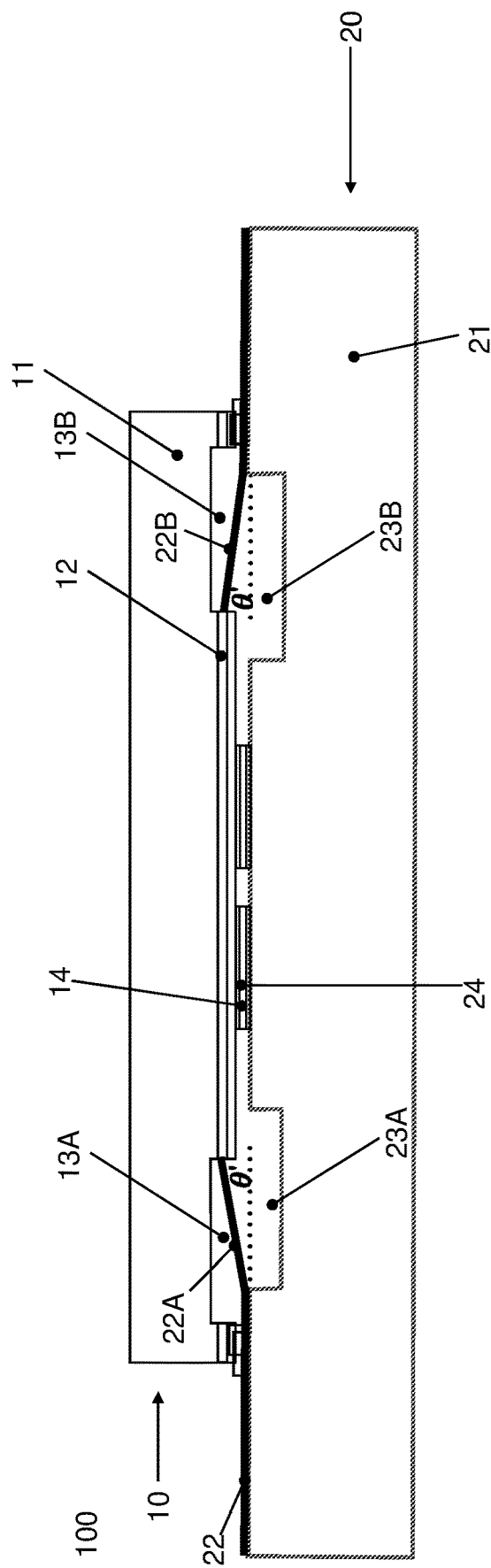

FIG. 1B shows assembly 100 in a coupled state. As shown, ends 22A have been guided towards the end walls of tapered recesses 13A, 13B so that the optical signal can be efficiently transferred from optical layer 12 to waveguide 22.

Flexible ends 22A, 22B bend upwards under an angle θ' relative to a plane that is parallel to substrate 21, wherein θ'<θ. In the uncoupled state, if flexible ends 22A, 22B were bent upwards under the angle θ', a distance between the tips of ends 22A, 22B would be less than D2. In this manner, it is ensured that flexible ends 22A, 22B would deform, preferably elastically, when coupling optically active circuit 10 and optically passive circuit 20 thereby exerting a force onto the end surfaces or walls of tapered recesses 13A, 13B.

Furthermore, first contact pads 14 are fixedly connected to second contact pads 24, e.g. by means of an intermediate solder layer or by a eutectic bonding. These contact pads can be used to transfer electrical signals and/or electrical power via the optically passive circuit 20 towards optically active circuit 10.

Figure 2A:
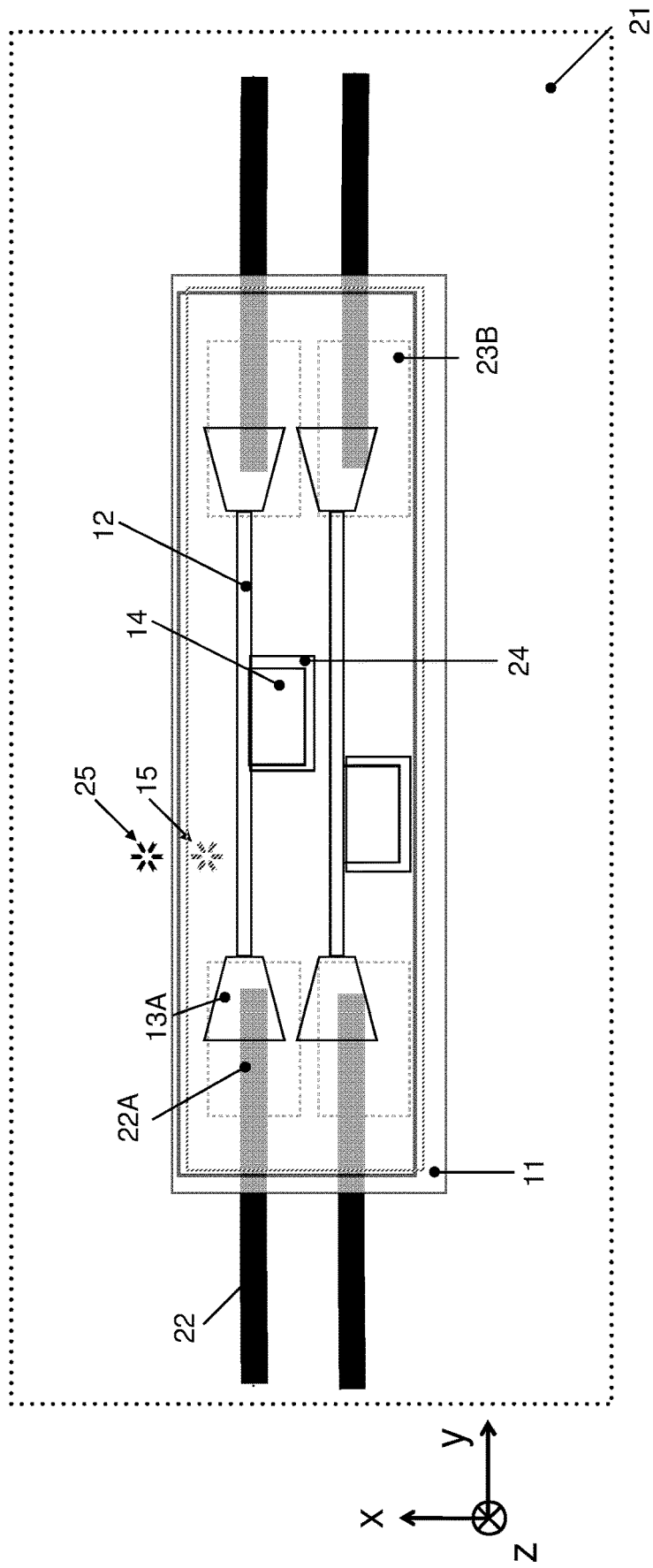
FIGS. 2A and 2B illustrate top views of coupling an optically active circuit coupled to an optically passive circuit in accordance with the present invention and FIGS. 2C and 2D illustrate a perspective view of tapered recess and the arrangement of a flexible end in such recess, respectively.
Figure 2B:
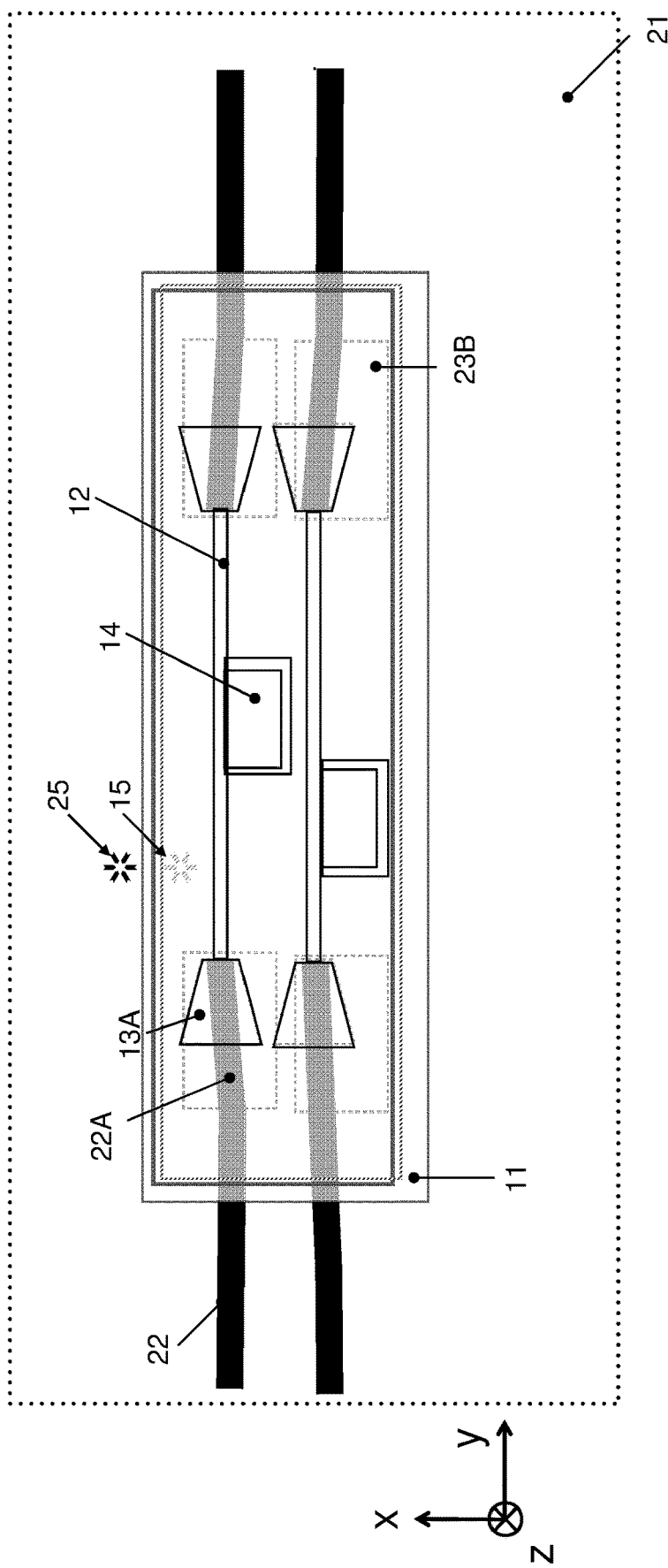
Figure 2D:
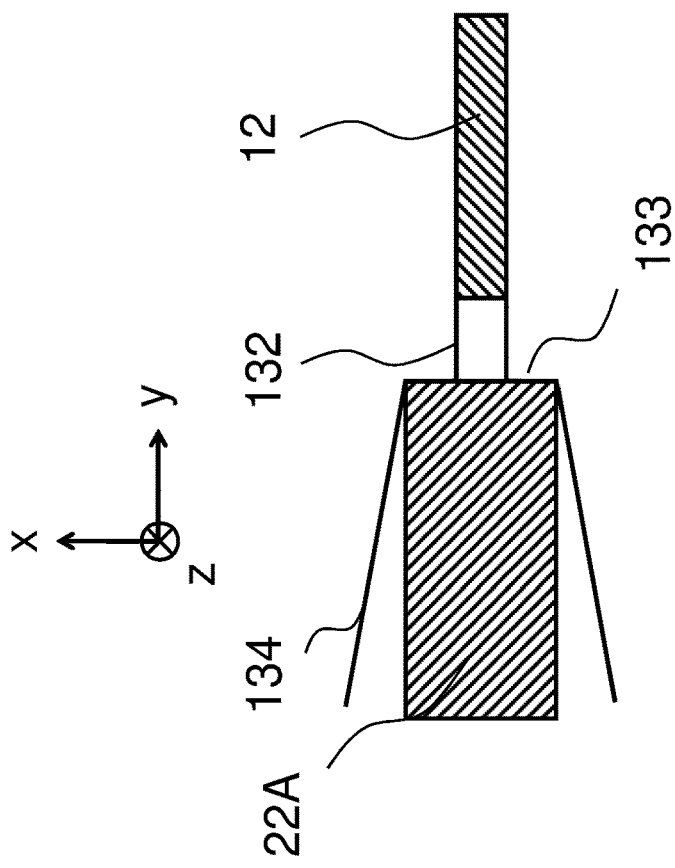
Figure 2C:
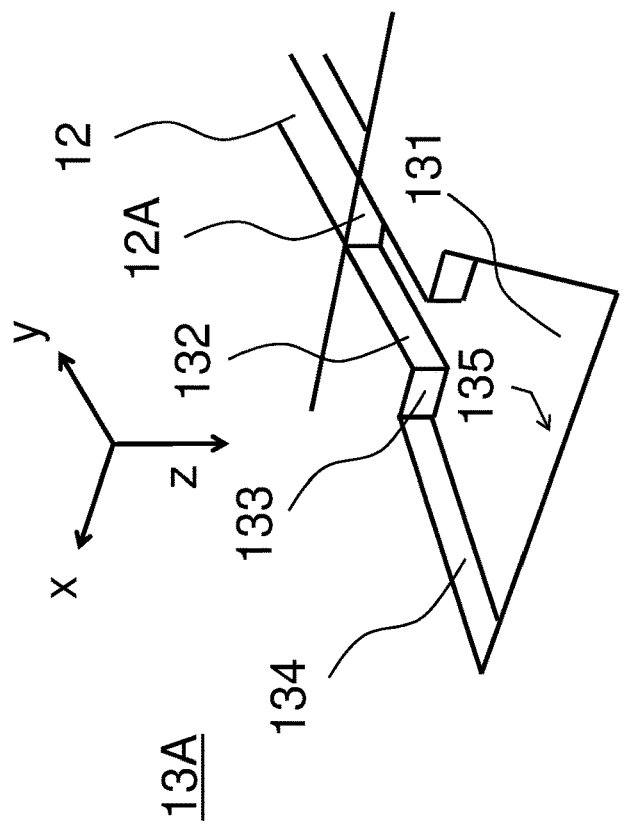

FIGS. 2A and 2B illustrate the process of coupling optically active circuit 10 to optically passive circuit 20 in top view. FIGS. 2C and 2D illustrate a perspective view of tapered recesses 13A, 13B and the arrangement of flexible ends 22A, 22B in recesses 13A, 13B, respectively.

As shown, a first alignment mark 15 is arranged on optically active substrate 11. Similarly, a second alignment mark 25 is arranged on optically passive substrate 21. In order to couple circuits 10, 20, optically active circuit 10 is positioned relative to optically passive circuit 20 using alignment marks 15, 25. For example, optically active circuit 10 is moved while optically passive circuit 20 is kept stationary to bring alignment marks 15, 20 in a predefined lateral registration. A predefined lateral registration is achieved when a distance between marks 15, 20 in both the x-direction and y-direction falls within a predefined range, e.g. between 45 and 48 micron. In a particular embodiment, the range for both x-direction and the y-direction is centered around 0.

By comparing FIG. 2A, which shows the uncoupled state, with FIG. 2B, which shows the coupled state, it can be observed that ends 22A 22B have been brought into close proximity of waveguides 12. This has been achieved by ends 22A, 22B being pushed by a bottom surface of recesses 13A, 13B and at least one side surface thereof towards a position at which ends 22A, 22B exert a spring force onto the end surfaces of tapered recesses 13A, 13B. This is shown in more detail in FIG. 2C.

FIG. 2C shows a perspective view of an embodiment of a tapered recess 13A. Here, recess 13A comprises a first part formed by bottom surface 131 and side surfaces 132. A facet 12A of waveguide 12 exits in this first part. Recess 13A further comprises a second part formed by bottom surface 131, side surfaces 133, 134 and rear surface 135.

FIG. 2D shows a top view of recess 13A in which a flexible end 22A has been arranged. Here, it can be seen that side surfaces 133, which form a boundary between the first and second parts of recess 13A, run substantially parallel to end facet 12A. Furthermore, a width of the first part, as measured in the x-direction, is greater than a width of waveguide 12 but less than a width of flexible end 22A. On the other hand, a width of the second part, also measured in the x-direction, is greater than a width of flexible end 22A. Only at the corner between surfaces 133, 134, the width of the second part may be substantially identical to the width of flexible end 22A. As shown in FIG. 2D, side surfaces 133 form end surfaces against which flexible ends 22A press. Furthermore, as can be seen from FIG. 2D, the light from waveguide 12 will pass through air before entering flexible end 22A.

Figure 3A:
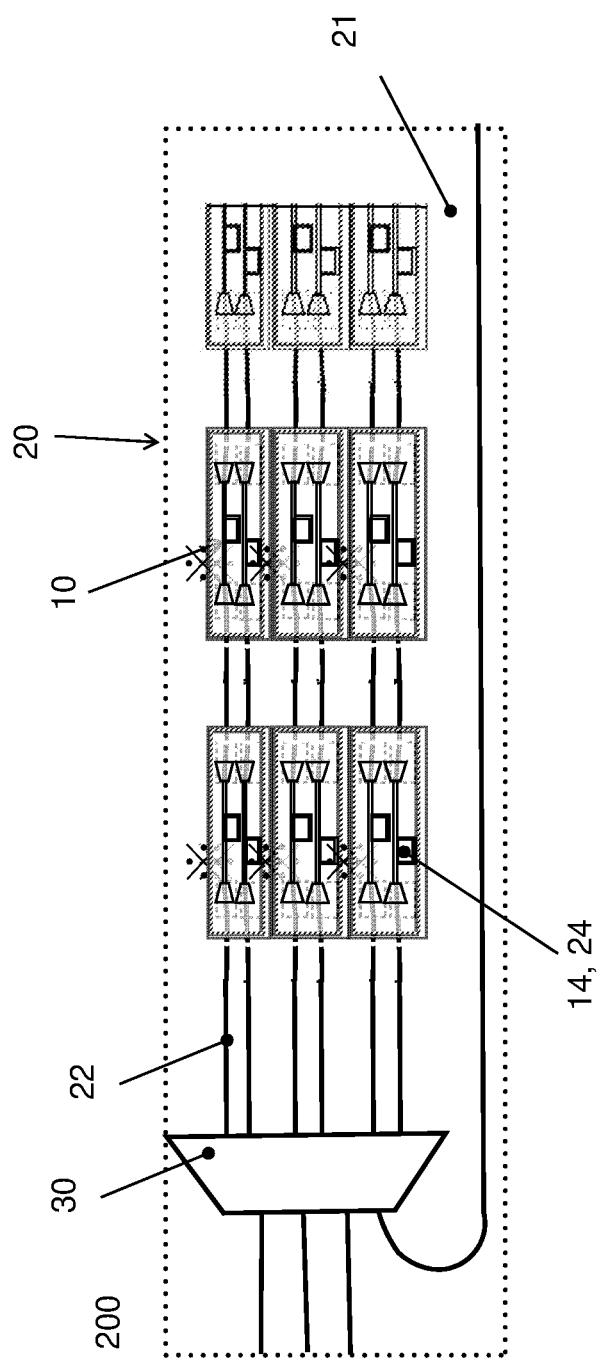
FIGS. 3A and 3B illustrate an optical device and a wafer holding a plurality of said devices, respectively.

FIG. 3A illustrates a hybrid photonic integrated circuit, 'PIC', 200 wherein a plurality of optically active circuits 10 is coupled to a single optically passive circuit 20. Here, each of the optically active circuits 10 performs a function such as light generation, amplification, switching, modulation, or detection, on each of two optical waveguides arranged on the optically active substrate. On optically passive circuit 20, waveguides 22 guide the various optical signals to a filter 30. It would be clear to the skilled person that PIC 200 is but a mere example of how various active functions can be realized on optically active circuit 10 and how various passive functions can be realized on optically passive circuit 20. The invention is therefore not limited to the example shown. Furthermore, the active functions typically require electric power and/or require and/or produce electrical signals. These can be transferred between optically passive circuit 20 and optically active circuit 10 using contact pads 14, 24.

Figure 3B:
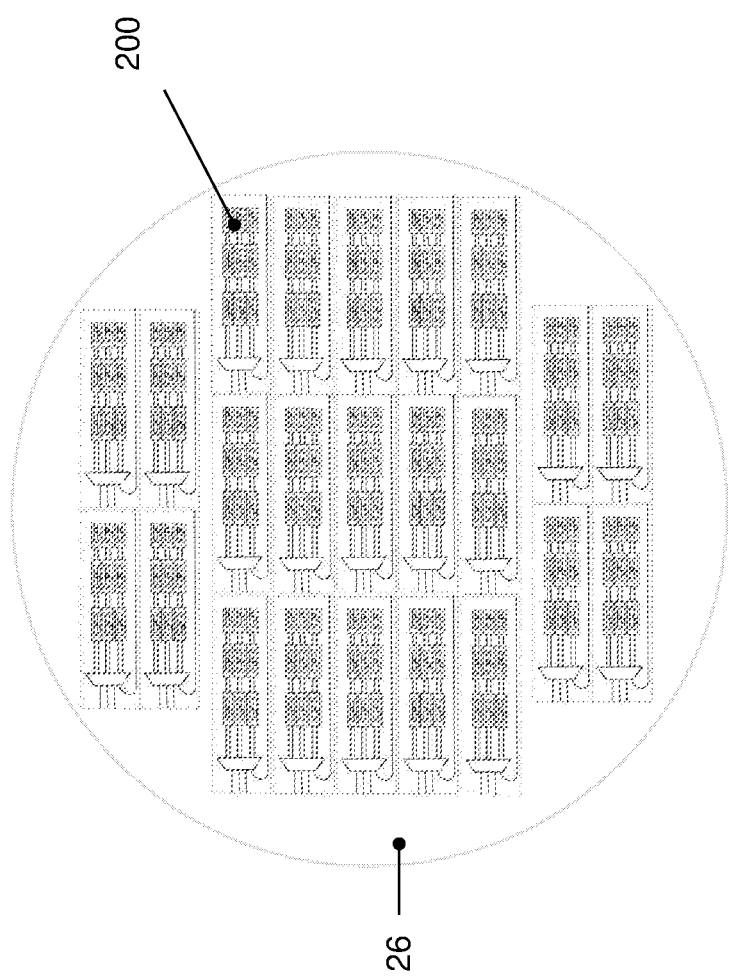

FIG. 3B illustrates a wafer 26 of which the optically passive substrates 21 are part. As shown, optically active circuits 10 can be mounted on optically passive circuits 20 while the substrates thereof are still mutually connected. After final processing, PICs 200 can be separated using known dicing techniques such as sawing.

FIGS. 4A-4D illustrate a process for manufacturing an optically active circuit 10 in accordance with the invention. Here, it is noted that for FIGS. 4A-4D, the upper figure illustrates a cross sectional view whereas the bottom figure illustrates a schematic top view. In each bottom figure, a line is indicated that indicates where the cross sectional view is taken.

Figure 4B:
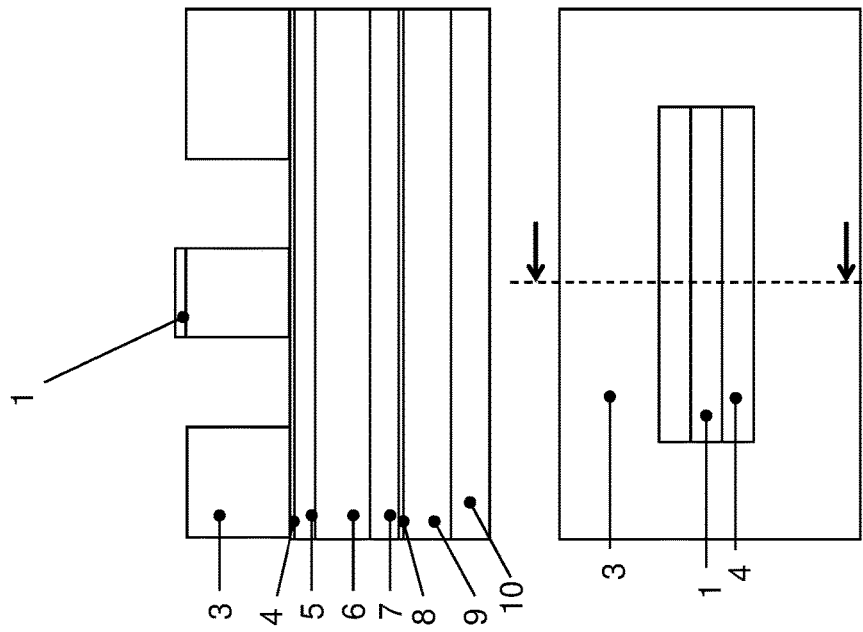
FIGS. 4A-4D illustrate different processing steps for manufacturing an optically active circuit in accordance with the present invention.
Figure 4A:
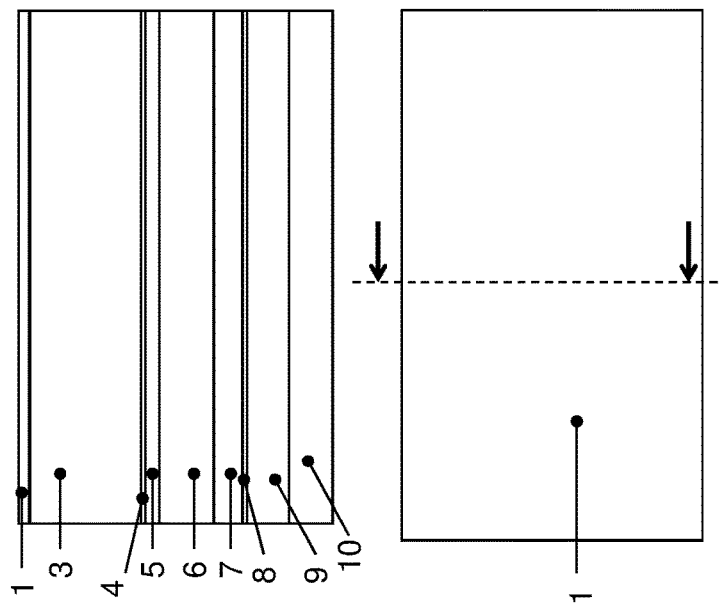

The process shown in FIGS. 4A-4D is based on indium phosphide technology and uses a semiconductor wafer comprising a layer stack as indicated in FIG. 4A. This layer stack comprises an indium phosphide (InP) substrate 10 with several epitaxial layers 1-9, as indicated in table 1.

TABLE 1

| Layer no in FIG. 3A | Description layer |
| --- | --- |
| 1 | InGaAs |
| 3 | InP p-doped |
| 4 | etch stop layer |
| 5 | InP p-doped |
| 6 | Active layer |
| 7 | InP n-doped |
| 8 | etch stop layer |
| 9 | InP n-doped |
| 10 | InP substrate |

FIG. 4B illustrates a first step in which contact layer 1 is partially removed and in which a waveguide has been formed by etching down to etch stop layer 4. More in particular, an etching technique is used for etching through the major part of layer 3. This etching step can be well controlled as it stops when it reaches layer 4.

A similar approach is followed for defining a contact to the n-doped InP layers. This is shown in FIG. 4C. This same etching step, up to etch stop layer 8, is used for defining tapered recess 303.

Figure 4D:
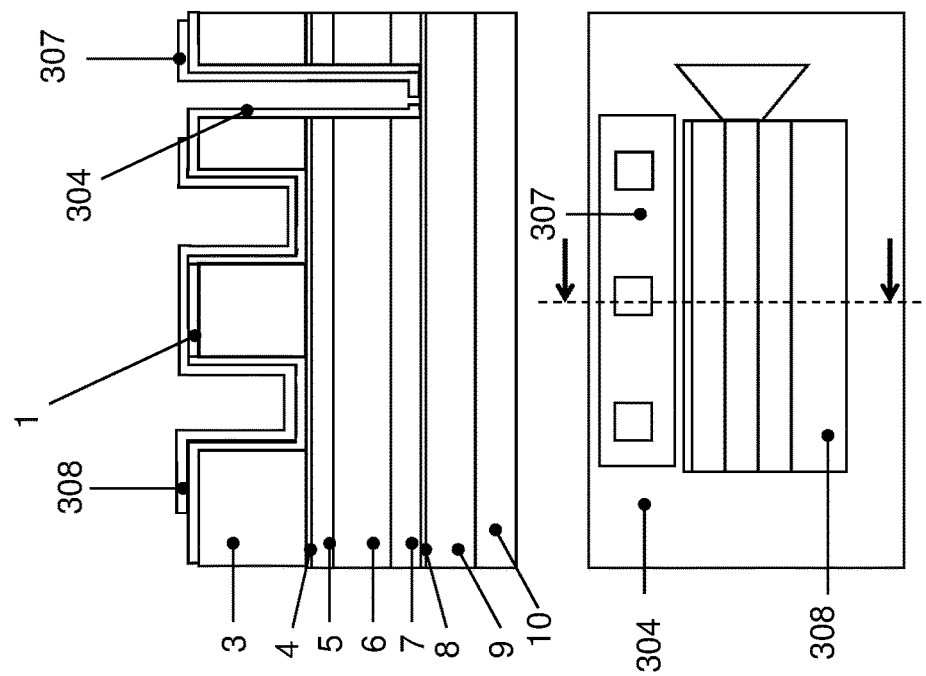
Figure 4C:
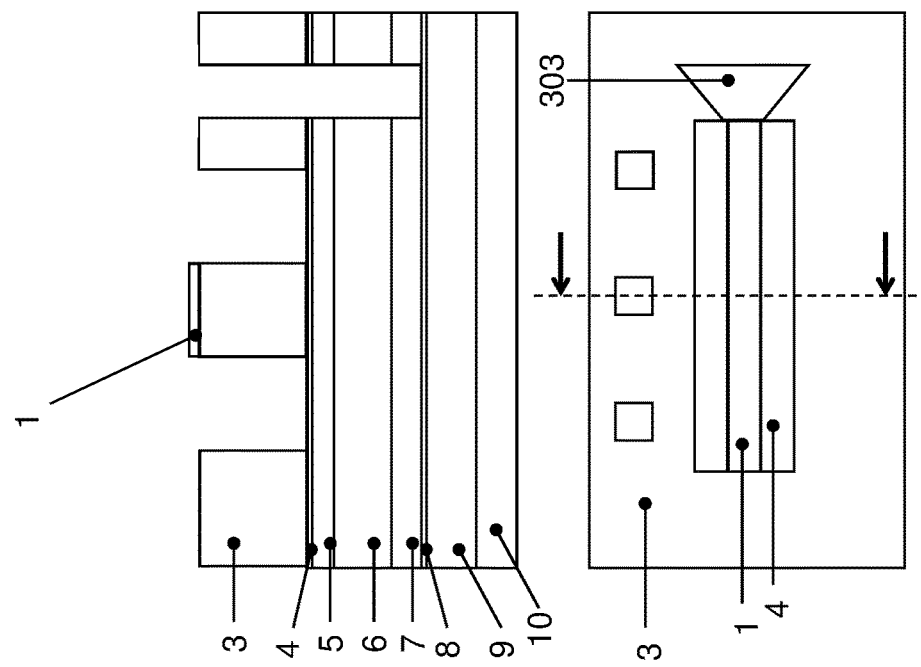

As shown in FIG. 4D, an anti-reflection, 'AR', coating layer 304 is applied, which is subsequently opened at the positions where an Ohmic contact should be realized. A patterned metal layer 308 is used for realizing a contact to InGaAs layer 1, hereinafter referred to as the P-contact, and another patterned metal layer 307 to n-doped InP layer 9, hereinafter referred to as the N-contact. As a final step, interconnect metal is applied for the N-contact and P-contact. This may be performed using a sputtering process.

Figure 5B:
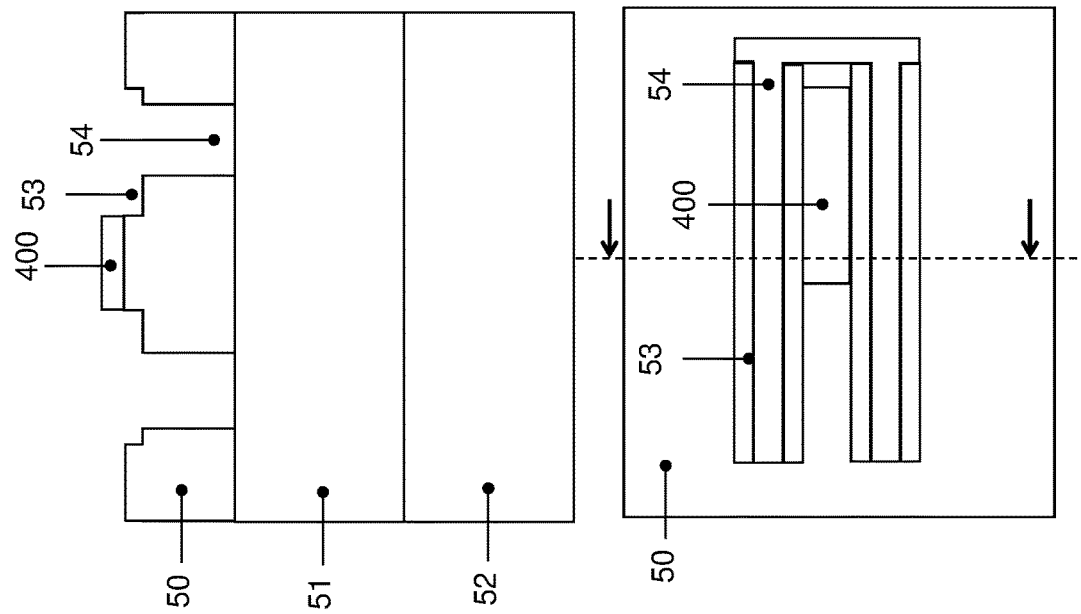
FIGS. 5A-5D illustrate different processing steps for manufacturing an optically passive circuit based on silicon-on-insulator technology.
Figure 5A:
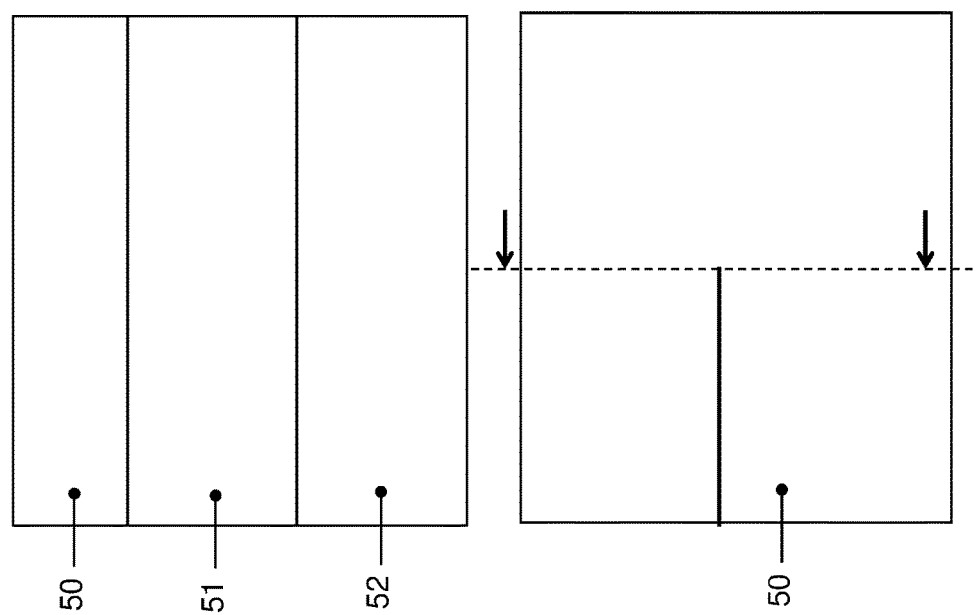
Figure 5D:
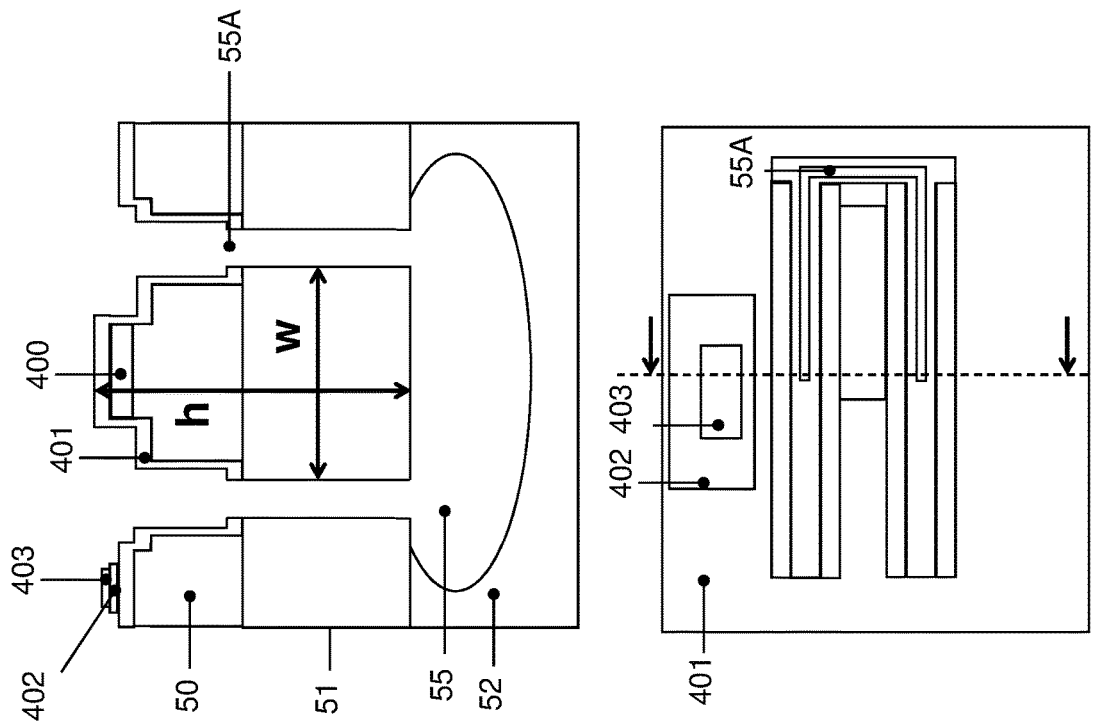

FIGS. 5A-5D illustrate different processing steps for manufacturing an optically passive circuit based on silicon-on-insulator technology. This processing uses a layer stack as illustrated in FIG. 5A. Here, a high resistivity silicon substrate 52 is preferably used that is covered by a buried silicon oxide 51. A layer 50 of monocrystalline silicon is arranged on top of the buried silicon oxide. Furthermore, it is noted that for FIGS. 5A-5D, the upper figure illustrates a cross sectional view whereas the bottom figure illustrates a schematic top view. In each bottom figure, a line is indicated that indicates where the cross sectional view is taken.

As a first step, shown in FIG. 5B, a silicon nitride $Si_xN_y$ layer 400 is deposited to introduce sufficient tensile strain to cause the ends of the waveguides to be formed to bend upwards. This layer is removed from other parts of the circuit.

Figure 5C:
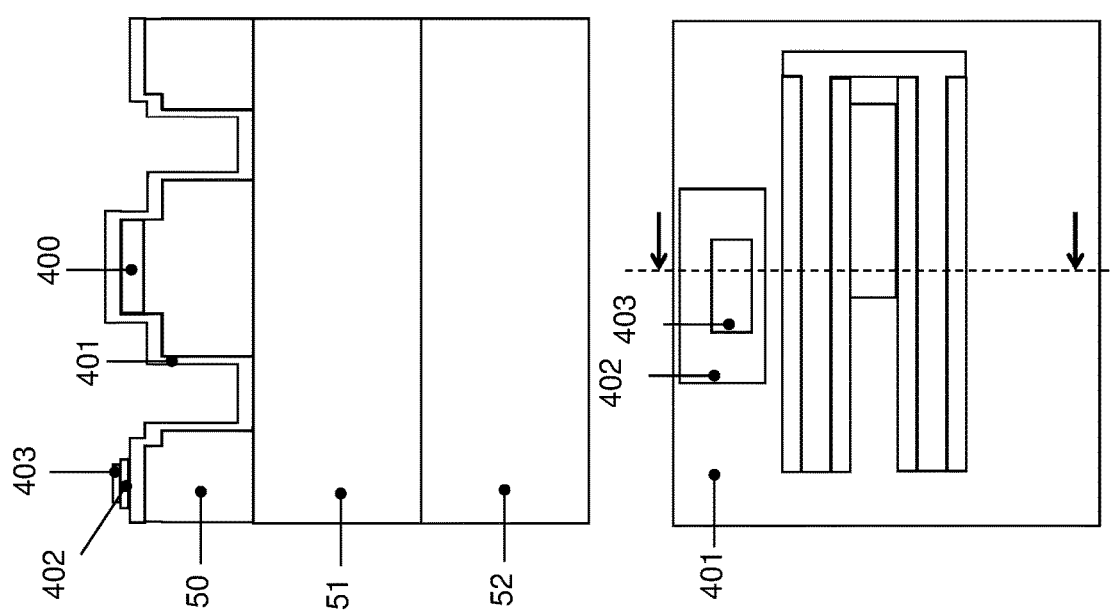

As a second step, also shown in FIG. 5B, a shallow etch is performed on silicon layer 50 to define a ridge waveguide therein. More in particular, a shallow recess 53 is defined. As a next step, also shown in FIG. 5B, a relatively deep recess 54 is etched inside recess 53 down to the buried silicon oxide layer 51. Thereafter, as shown in FIG. 5C, an antireflective coating layer 401 is applied. Metallization 402 will be applied for routing power and/or electrical signals to and from the optically active circuit that is to be connected to the optically passive circuit. Next, a relatively thick electroplated metal 403 is applied for achieving low ohmic resistance and for allowing eutectic bonding. Following, in FIG. 5D, an opening 55A is defined followed by a dry etching step to etch through the antireflection coating layer 401 and the buried oxide layer 51. As a final step, an anisotropic etch is performed to remove silicon substrate 52 underneath an end of the waveguide. The anisotropic etch will generate a cavity 55. Due to the residual strain in this waveguide, formed in FIG. 5D using layers 400, 50, 51, the end will bend upwards and away from silicon substrate 52, similar to what is shown in FIGS. 1A and 1B. By ensuring that the width w of end of the waveguide is comparable to its height h, torsion in the end of the waveguide caused by engagement with the tapered recess during the process of aligning the end of the waveguide to the waveguides on the optically active circuit as shown in FIGS. 1-2 can be prevented.

FIGS. 6A-6D illustrate different processing steps for manufacturing an optically passive circuit wherein the optical waveguides are formed using a silicon nitride layer embedded in a silicon oxide layer. It is noted that for FIGS. 6A-6D, the upper figure illustrates a cross sectional view whereas the bottom figure illustrates a schematic top view. In each bottom figure, a line is indicated that indicates where the cross sectional view is taken.

As shown in FIG. 6A, a silicon substrate 71 is used on top of which a silicon oxide $Si_xO_y$ layer 70A is thermally grown which will act as a cladding layer. Thereafter, a silicon nitride $Si_xN_y$ layer 72 is deposited that will act as a guiding layer. After defining the waveguide using etching, a further silicon oxide $Si_xO_y$ layer 70B is grown. In this manner, guiding layer 72 is completely embedded in cladding layer 70A, 70B. As a next step, shown in FIG. 6B, a $Si_xN_y$ layer 73, which introduces tensile strain, is deposited only at those positions where the upward bending ends of the waveguides need to be defined. Furthermore, the optical waveguide is defined by etching through cladding layers 70A, 70B up to silicon substrate 71.

As a next step, shown in FIG. 6C, an AR layer 74 and metals 75, 76 are applied. As shown in FIG. 6D, an opening 77A is created in AR layer 74 for subsequent anisotropic etching of substrate 71 as shown in FIG. 6E. After etching away substrate 71, a cavity 77 is formed and the end of the waveguide will bend upwards.

FIG. 7A illustrates a decomposition of the direction along which a flexible end extends away from the second optical substrate, and FIG. 7B illustrates an example in which the forces exerted by the flexible ends in different directions substantially compensate each other.

In FIG. 7A, a flexible end 80 is shown that extends relative to the x-y plane, which plane is parallel to optically passive substrate 21. The direction along which flexible end 80 extends can be decomposed in a component c2 that is parallel to the x-y plane and in a component c1 that is perpendicular to the x-y plane. In turn, parallel component c2 can be decomposed in a second component c2_1 along the x-axis and a third component c2_2 along the y-axis.

The decomposition shown in FIG. 7A can be performed for each flexible end. For example, FIG. 7B illustrates an optically active circuit 86 that is mounted on an optically passive circuit 85. Optically passive circuit 85 comprises four flexible ends 80 corresponding to four waveguides 81. In addition, optically passive circuit 86 comprises four tapered recesses 84 by which flexible ends 80 are optically coupled to waveguides 82 on optically active circuit 86. Optically active circuit 86 further comprises an active component 83 that generates or acts on optical signals in waveguides 82.

Each of the flexible ends 80 extends away from the optically passive substrate along a different direction. By applying the decomposition scheme of FIG. 7A, it can be verified that the parallel components corresponding to these different directions, when added together, would substantially cancel each other. In this manner, it can be ensured that optically active circuit 86 is clamped by optically passive circuit 85 in a substantial symmetric manner.

In the above, the present invention had been explained using detailed embodiments thereof. It should be apparent that the invention is not limited to these embodiments but that various modifications are possible without deviating from the scope of the invention, which is defined by the appended claims.

The invention claimed is:

1. An optical assembly, comprising:
   a first optical circuit, comprising:
      a first optical substrate;
      at least one first optical waveguide formed in the first optical substrate; and
      a first tapered recess in the first optical substrate arranged near a first end of a first optical waveguide among the at least one first optical waveguide, said first tapered recess having a bottom surface, an end surface, and a pair of side surfaces extending from the bottom surface; and
   a second optical circuit configured to be fixedly coupled to the first optical circuit and comprising:
      a second optical substrate;
      at least one second optical waveguide formed in the second optical substrate; and
      a first recess underneath a first end of a second optical waveguide among the at least one second optical waveguide, wherein said first end of a second optical waveguide forms a first flexible end;
   wherein the first optical circuit further comprises a second tapered recess arranged near a second end of a first optical waveguide among the at least one first optical waveguide, said second tapered recess having a bottom surface, an end surface, and a pair of side surfaces extending from the bottom surface, and in that the second optical circuit further comprises a second recess underneath a second end of a second optical waveguide among the at least one second optical waveguide, wherein said second end of a second optical waveguide forms a second flexible end, respectively, wherein the first and second flexible end extend away from the second optical substrate along at least partially opposite directions in absence of external forces acting thereon, wherein said first and second flexible end are configured to be received in the first and second tapered recess, respectively, for the purpose of allowing the first and second flexible end to exert a spring force onto the end surface of the first and second tapered recess, respectively, when fixedly coupling the first and second optical circuit, wherein, when the first and second optical circuit are fixedly connected, the first optical waveguide having the first tapered recess arranged near its first end is optically coupled via the end surface of the first tapered recess to the second optical waveguide having the first recess arranged near its first end and the first optical waveguide having the second tapered recess arranged near its second end is optically coupled via the end surface of the second tapered recess to the second optical waveguide having the second recess arranged near its second end, and wherein the first optical circuit is one among an optically active circuit and an optically passive circuit and wherein the second optical circuit is the other among the optically active circuit and an optically passive circuit.

2. The optical assembly according to claim 1, wherein the first optical circuit is an optically active circuit, and wherein the second optical circuit is an optically passive circuit.

3. The optical assembly according to claim 1, wherein said first end of a first optical waveguide and said second end of a first optical waveguide are ends at opposite sides of a same first optical waveguide, or
wherein said first end of a first optical waveguide and said second end of a first optical waveguide are ends of different first optical waveguides.

4. The optical assembly according to claim 1, wherein the first optical circuit further comprises one or more first contact pads and a first alignment mark, and wherein the second optical circuit further comprises one or more second contact pads and a second alignment mark ;
wherein the one or more first contact pads are configured to be fixedly connected to the one or more second contact pads,
wherein the one or more first contact pads and the one or more second contact pads each comprise one or more metal layers to allow them to be connected through soldering, such as eutectic soldering, or bonding, such as eutectic bonding, using the simultaneous application of heat and pressure, and
wherein the first optical circuit and the second optical circuit are configured such that when the first optical circuit and the second optical circuit have been mutually moved to bring the first and second alignment mark into a predefined lateral registration, and the first optical circuit and second optical circuit are subsequently brought closer together without substantially changing the lateral registration, the first and second flexible end are guided towards said first end of a first optical waveguide and said second end of a first optical waveguide by the bottom surface and at least one of the side surfaces of the first and second tapered recess, respectively, thereby enabling an optical coupling between said first flexible end and said first end of a first optical waveguide and between said second flexible end and said second end of a first optical waveguide.

5. The optical assembly according to claim 1, wherein a distance between the first and second flexible end prior to the first and second optical circuits engaging each other is greater than a distance between the end surface of the first tapered recess and the end surface of the second tapered recess, and wherein a distance between the first and second flexible end, if these ends are bent to be in line with the corresponding second optical waveguide, is smaller than a distance between the end surface of the first tapered recess and the end surface of the second tapered recess.

6. The optical assembly according to claim 1, wherein the first and second flexible end extend away from the second optical substrate along a first direction and second direction, respectively, each of the first and second direction having a component parallel to the second optical substrate and a component perpendicular to the second optical substrate, wherein the parallel components corresponding to the first and second flexible end point in at least partially opposite directions.

7. The optical assembly according to claim 6, wherein each parallel component can be divided in a second component along a third direction and a third component along a fourth direction perpendicular to the third direction, wherein the second component corresponding to the first direction is opposite to the second component corresponding to the second direction and/or wherein the third component corresponding to the first direction is opposite to the third component corresponding to the second direction.

8. The optical assembly according to claim 1, comprising a plurality of said first tapered recesses for a corresponding plurality of first optical waveguides, a plurality of said second tapered recesses for a corresponding plurality of first optical waveguides, a plurality of said first flexible ends for a corresponding plurality of second optical waveguides, and a plurality of said second flexible ends for a corresponding plurality of second optical waveguides, each first and second flexible end being configured to be received in a respective first and second tapered recess, respectively, the first and second flexible ends each extending away from the second optical substrate along a respective first direction and a respective second direction, respectively, each of the respective first and second direction having a component parallel to the second optical substrate and a component perpendicular to the second optical substrate,
wherein each respective parallel component can be divided in a second component along a third direction and a third component along a fourth direction perpendicular to the third direction, and
wherein a sum of the second components and/or a sum of the third components is substantially zero.

9. The optical assembly according to claim 1, wherein the at least one second optical waveguide comprises a first layer arranged on a second layer,
wherein, when the first and second optical circuits are fixedly connected, the first layer is arranged in between the second layer and the first optical substrate, and
wherein the first layer is under tensile strain relative to the second layer or wherein the second layer is under compressive strain relative to the first layer.

10. The optical assembly according to claim 9, wherein the first layer is only provided on the second layer in a region corresponding to the first and second flexible end.

11. The optical assembly according to claim 1, wherein a maximum angle of inclination of the first and second flexible end relative to a plane parallel to the second optical substrate lies in a range between 1 and 45 degrees, wherein a length of the first and second flexible end lies in a range between 50 and 1000 micrometer,
  wherein a width of the first and second flexible end lies in a range between 0.5 and 20 micrometer, and wherein a thickness of the first and second flexible end lies within a range between 50 and 150 percent of the width of the first and second flexible end, respectively, and
  wherein a width of the at least one first optical waveguide lies in a range between 0.1 and 10 micrometer, and wherein a thickness of the at least one first optical waveguide lies in a range between 0.1 and 5 micrometer.

12. The optical assembly according to claim 1, wherein at least one passive element of the group of passive elements consisting of a waveguide, a filter, a combiner, a polarization convertor, and a splitter, is implemented in the optically passive circuit.

13. The optical assembly according to claim 1, wherein at least one active element of the group of active elements consisting of a laser, a semiconductor optical amplifier, a phase modulator, an amplitude modulator, and a photodetector is implemented in the optically active circuit,
  wherein the optically active circuit comprises one or more electrical terminals connected to said at least one active element for receiving or outputting an electrical signal and/or for receiving electrical power, wherein at least one among said one or more electrical terminals is connected to and/or formed by a respective first contact pad among the one or more first contact pads.

14. The optical assembly according to claim 1, wherein said first optical waveguide among the at least one first optical waveguide ends in the corresponding first and/or second tapered recess, wherein an end facet of the first optical waveguide that is arranged near the corresponding first or second tapered recess forms the end surface of that tapered recess, or wherein the corresponding first and/or second tapered recess comprises:
  a first segment in which said first optical waveguide among the at least one first optical waveguide ends, which first segment is wider than a last part of that first optical waveguide but smaller than the first or second flexible end of the corresponding second optical waveguide that is to be received in said corresponding first or second tapered recess,
  a second segment connected to the first segment, which second segment is wider than both the first segment and the first or second flexible end of the corresponding second optical waveguide that is to be received in said corresponding first or second tapered recess, and
  wherein a boundary between the first and second segments is configured to form the end surface of the corresponding first or second tapered recess against which the first or second flexible end of the corresponding second optical waveguide that is to be received in said corresponding first or second tapered recess abuts after having fixedly connected the one or more first and second contact pads.

15. The optical assembly according to claim 1, wherein the optically active circuit further comprises a first contact ring arranged around the at least one first optical waveguide, and wherein the optically passive circuit further comprises a second contact ring arranged around the at least one second optical waveguide, wherein the first and second contact rings are configured to be fixedly connected to each other for the purpose of providing a sealing for the at least one first optical waveguide and the at least one second optical waveguide,
  wherein the first and second contact ring each comprise one or more metal layers to allow them to be connected through soldering, such as eutectic soldering, or bonding, such as eutectic bonding, using the simultaneous application of heat and pressure.

16. The optical assembly according to claim 1, wherein the first or second optical substrate corresponding to the optically active circuit comprises a first cladding layer having a first doping type, a second cladding layer having a second doping type different from the first doping type, and an active layer arranged in between the first and second cladding layers,
  wherein the at least one first or second optical waveguide being part of the optically active circuit has been formed by etching through at least a part of the first cladding layer, and
  wherein the optically active circuit comprises a first metal contact to the first cladding layer that is connected to a respective first or second contact pad among the one or more first or second contact pads, and a second metal contact to the second cladding layer that is connected to a respective first or second contact pad among the one or more first or second contact pads.

17. The optical assembly according to claim 2, wherein the optically passive substrate comprises a guiding layer, a carrier substrate, and a cladding layer arranged in between the guiding layer and the carrier substrate,
  wherein the at least one first or second optical waveguide being part of the optically passive circuit has been formed by etching through the cladding layer and guiding layer, preferably up to the carrier substrate, and
  wherein the first and second flexible end of said a second optical waveguide among the at least one second optical waveguide have been formed by partially etching the carrier substrate underneath the cladding layer.

18. The optical assembly according to claim 17, further comprising a stress layer arranged on the guiding layer, which stress layer is under tensile strain and which stress layer is configured to cause, at least in part, the upward bending of the first and second flexible waveguide.

19. The optical assembly according to claim 17, wherein the guiding layer is embedded into the cladding layer,
  wherein the at least one first or second optical waveguide being part of the optically passive circuit has been formed by etching through the cladding layer.

20. An optical device comprising the optical assembly of claim 1, wherein the optically active circuit is fixedly connected to the optically passive circuit.

* * * * *